US006516335B1

(12) United States Patent
Martin et al.

(10) Patent No.: US 6,516,335 B1
(45) Date of Patent: Feb. 4, 2003

(54) INCREMENTER/DECREMENTER HAVING A REDUCED FANOUT ARCHITECTURE

(75) Inventors: Robert J Martin, Timnath, CO (US); Gregory S. Dix, Fort Collins, CO (US); Linda L. Lin, Ft. Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/386,869

(22) Filed: Aug. 31, 1999

Related U.S. Application Data

(63) Continuation-in-part of application No. 09/146,693, filed on Sep. 3, 1998.

(51) Int. Cl.[7] .................................................. G06F 7/50
(52) U.S. Cl. ...................................................... 708/672
(58) Field of Search ........................................ 708/672

(56) References Cited

U.S. PATENT DOCUMENTS

| | | | | | |
|---|---|---|---|---|---|
| 4,153,939 A | * | 5/1979 | Kudou | ...................... | 708/672 |
| 4,486,851 A | * | 12/1984 | Christopher et al. | ........ | 377/123 |
| 4,685,078 A | * | 8/1987 | Torres | ........................ | 708/672 |
| 5,018,094 A | | 5/1991 | Fischer et al. | .............. | 364/770 |
| 5,027,310 A | * | 6/1991 | Dairymple | .................. | 708/672 |
| 5,635,858 A | * | 6/1997 | Chang et al. | ................ | 708/672 |
| 5,636,156 A | * | 6/1997 | Mikan et al. | ................ | 708/712 |
| 5,877,972 A | * | 3/1999 | Aoki et al. | .................. | 708/672 |

OTHER PUBLICATIONS

Simon Knowles, A Family of Adders, Proceedings of the Symposium on Computer Arithmetic, Apr. 14, 1999.

* cited by examiner

*Primary Examiner*—David H. Malzahn
(74) *Attorney, Agent, or Firm*—Alex J. Neudeck

(57) ABSTRACT

An incrementer/decrementer architecture having a reduced internal block fanout which is achieved efficiently in terms of the silicon area needed to implement the incrementer/decrementer. The incrementer/decrementer of the present invention is characterized by a modified tree structure having operators located in such a manner that the maximum internal block fanout is equal to (incrementer/decrementer width)/8 for incrementer/decrementers having a width of at least 16 bits. For incrementer/decrementers having a width of less than 16 bits, the internal block fanout is 2. The routing complexity is increased in order to implement redundant overlapping operations which, in turn, decreases the internal block fanout. However, increases in routing complexity can be accomplished within the minimum X-by-Y area of each stage of the incrementer/decrementer. Therefore, the overall performance of the incrementer/decrementer of the present invention can be optimized while meeting minimum area requirements.

18 Claims, 7 Drawing Sheets

INCREMENTER/DECREMENTER HAVING A REDUCED FANOUT ARCHITECTURE

CROSS-REFERENCE TO RELATED APPLICATION

This application is a continuation-in-part application of a commonly-assigned co-pending U.S. patent application having Ser. No. 09/146,693, filed Sep. 3, 1998, entitled "A Carry Lookahead Adder Having A Reduced Fanout Architecture".

TECHNICAL FIELD OF THE INVENTION

The present invention relates to an incrementer/decrementer and, more particularly, to an incrementer/decrementer having a reduced internal block fanout architecture that reduces propagation delays and which can be implemented without realizing area penalties.

BACKGROUND OF THE INVENTION

One known type of incrementer/decrementer architecture is characterized by an internal block fanout of (incrementer/decrementer width)/2 and a routing complexity of a single propagate signal. One disadvantage of this type of architecture is that performance limitations result from the excessive internal block fanout of the incrementer/decrementer. FIG. 1 illustrates this type of architecture. Each of the "Os" in FIG. 1 represent a logic circuit, each of which is comprised of one or more logic gates. Bit 0 and bits 9 through 15 each have an internal block fanout of 1, bits 1, 2 and 4 through 7 each have an internal block fanout of 2, bit 3 has an internal block fanout of 5, and bit 8 has an internal block fanout of 8.

Therefore, the maximum internal block fanout for the incrementer/decrementer illustrated in FIG. 1 is 8, which is extremely large. The propagation delays resulting from the large internal block fanout greatly limit its performance. However, the routing complexity is relatively simple, which is an advantage of this type of architecture in terms of silicon area required to realize the incrementer/decrementer.

A second known type of incrementer/decrementer architecture, which is not shown, is characterized by an internal block fanout of 1 and a routing complexity of (incrementer/decrementer width)/2. One disadvantage of this second type of architecture is that the routing complexity results in unrealistic silicon area penalties, although the single internal block fanout reduces propagation delays. If the routing complexity is simplified, the internal block fanout increases dramatically, thereby resulting in performance limitations in terms of large propagation delays.

Accordingly, a need exists for an incrementer/decrementer architecture that eliminates performance limitation problems caused by excessive internal block fanout and which is efficient in terms of the silicon area required in order to accommodate the routing complexity of the incrementer/decrementer.

SUMMARY OF THE INVENTION

The present invention provides an incrementer/decrementer having a reduced internal block fanout that is achieved efficiently in terms of the silicon area needed to implement the incrementer/decrementer. The incrementer/decrementer of the present invention is characterized by a modified "binary tree" structure and having redundant overlapping carry generate/propagate signal operators located in such a manner that the maximum internal block fanout is equal to (incrementer/decrementer width)/8 for incrementer/decrementers having a width of at least 16 bits. For incrementer/decrementers having a width of less than 16 bits, the internal block fanout is 2.

As a result of the redundant overlapping operators, the internal block fanout is reduced without realizing area penalties. Since increases in routing complexity are accomplished by redundantly overlapping the operators, no increases in area are required for implementing the incrementer/decrementer of the present invention.

In accordance with the present invention, any increases in routing complexity can be accomplished within the minimum X-by-Y area of each stage of the incrementer/decrementer. For each stage of a incrementer/decrementer, the minimum X dimension of the stage is defined by the number of bits being added together by the incrementer/decrementer. The minimum Y dimension of each stage is defined by the logic circuits, also referred to herein as the operators, implemented in the stage for performing the logical operations. Therefore, the minimum area of each stage is defined by the minimum X dimension times the minimum Y dimension, hereinafter referred to as the minimum X-by-Y area.

With existing architectures, when attempts have been made to decrease the internal block fanout of the incrementer/decrementer by increasing the routing complexity, this was not accomplished within the minimum X-by-Y area. Rather, the overall area of the incrementer/decrementer was increased due to increases in the area of one or more stages of the incrementer/decrementer needed to accommodate the additional routing.. In accordance with the present invention, all routing for each stage can be, but does not have to be, accomplished within the minimum X-by-Y area for the stage. Therefore, the overall performance of the incrementer/decrementer of the present invention can be optimized while meeting minimum area requirements.

Other features and advantages of the present invention will become apparent from the following description, drawings and claims.

DETAILED DESCRIPTION OF THE INVENTION

Figure 1:
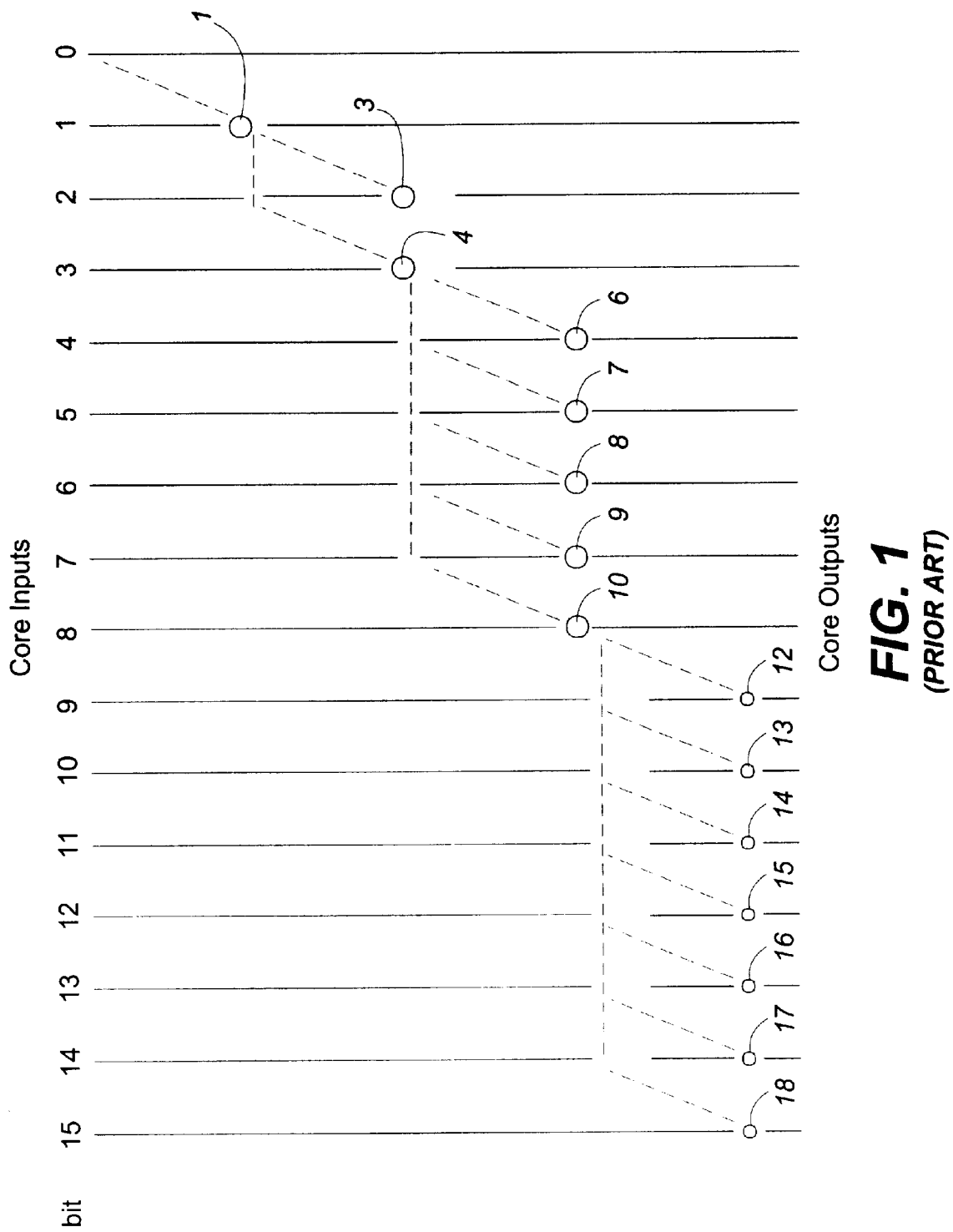
FIG. 1 functionally illustrates an existing incrementer/decrementer architecture having an internal block fanout equal to (incrementer/decrementer width)/2 and a routing complexity of a single propagate signal.

As stated above, FIG. 1 is a drawing which illustrates an existing incrementer/decrementer architecture having an internal block fanout equal to (incrementer/decrementer width)/2 and a routing complexity of a single propagate signal. The large "Os" in FIG. 1 indicate that the logic circuits, also referred to herein as operators, comprise relatively large logic gates, whereas the small "Os" indicate that the logic circuits comprise relatively small logic gates. All of the operators comprised by the incrementer/decrementer and the connections between them are not shown in FIG. 1 for ease of illustration. The dashed lines represent the critical path of the signals through the incrementer/decrementer, which corresponds to the furthest distance a bit must be routed through the incrementer/decrementer from bit 0 at the input stage to bit 15 at the output stage. Only the operators that make up the critical path are shown in FIG. 1.

Logic circuit 1 under the core input corresponding to bit 1 is comprised by stage 1 of the incrementer/decrementer. Logic circuits 3 and 4 under the core inputs corresponding to bits 2 and 3, respectively, are comprised by stage 2 of the incrementer/decrementer. Logic circuits 6 through 10 under the core inputs corresponding to bits 4 through 8, respectively, are comprised by stage 3 of the incrementer/decrementer. Logic circuits 12 through 18 under the core inputs corresponding to bits 9 through 15, respectively, are comprised by stage 4 of the incrementer/decrementer.

The relatively large logic gates of the operators represented by the large "Os" are capable of driving a plurality of gates in subsequent stages and/or of driving signals over relatively long routing paths. With respect to stage 1, the logic circuit 1 under the core input for bit 1, has an internal block fanout of 2 since it drives two operators in stage 2, namely, operators 3 and 4 under the core inputs for bits 2 and 3, respectively. Operator 4 under the core input for bit 3 has an internal block fanout of 5 since it drives five operators in stage 3, namely, operators 6 through 10 under the core inputs for bits 4 through 7, respectively. Operator 10 under the core input for bit 8 has an internal block fanout of 8 since it drives operators 12 through 18 under the core inputs for bits 9 through 15, respectively.

The routing scheme implemented by the incrementer/decrementer illustrated in FIG. 1 is relatively simple. This can be seen from the fact that, along the critical path, the output of only one operator is utilized in a subsequent stage, and only in the immediately succeeding stage. In stage 2, only the output of operator 4 is used in a subsequent stage, and only in the immediately succeeding stage, namely, stage 3. Similarly, in stage 3, only the output of operator 10 is used in stage 4.

However, although the routing complexity of the incrementer/decrementer functionally illustrated in FIG. 1 is relatively simple, the internal block fanout is relatively large. Consequently, the performance of the incrementer/decrementer will be limited due to large propagation delays.

Figure 2:
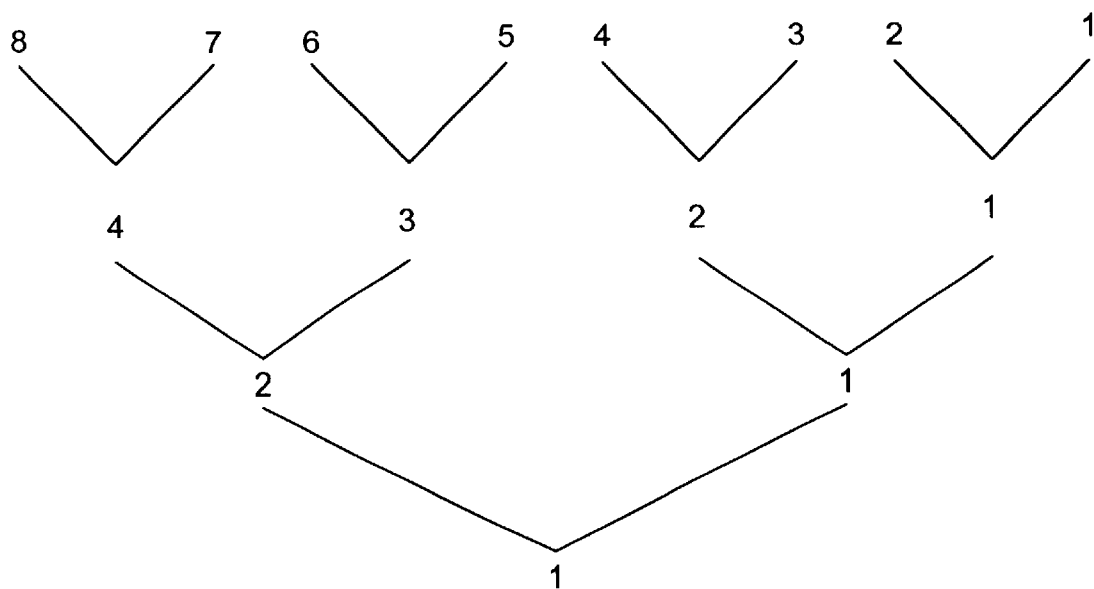
FIG. 2 illustrates a typical binary tree structure used by existing incrementer/decrementers.

FIG. 2 illustrates the binary tree structure for the incrementer/decrementer shown in FIG. 1. This structure is called a binary tree because of the manner in which each subsequent stage of the incrementer/decrementer performs half the number of operations performed in the immediately preceding stage.

Figure 3:
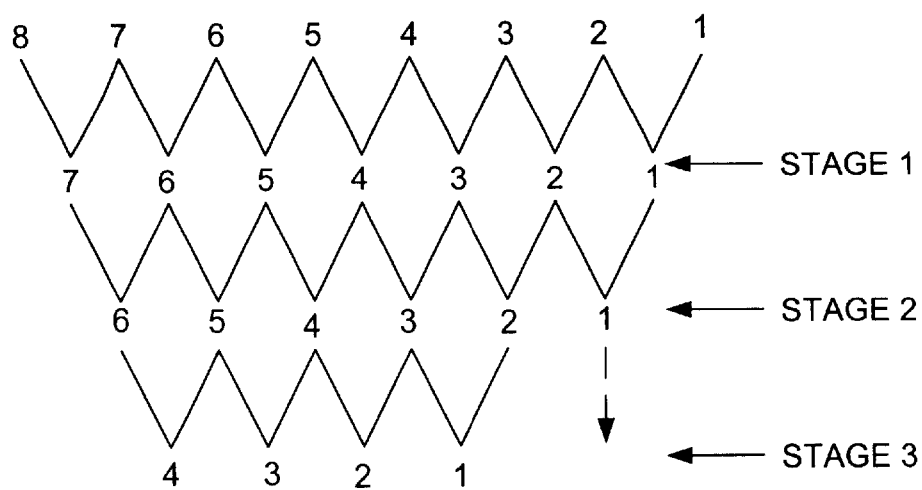
FIG. 3 illustrates a modified binary tree structure of the incrementer/decrementer of the present invention.

FIG. 3 illustrates the modified binary tree structure of the present invention in accordance with the preferred embodiment. It is readily apparent from FIG. 3 that the modified binary tree structure of the present invention performs many more operations than the structure represented by FIG. 2. In accordance with the present invention, redundant overlapping operations are performed. In the first core stage of the incrementer/decrementer, stage 1, the number of operations performed is equal to the incrementer/decrementer width minus 1, or 7 in the case of the 8-bit incrementer/decrementer. In the second core stage of the incrementer/decrementer, stage 2, the number of operations performed is equal to the incrementer/decrementer width minus 2, or 6 in the case of the 8-bit incrementer/decrementer. In the third core stage of the incrementer/decrementer, stage 3, the number of operations performed is equal to the incrementer/decrementer width divided by 2, or 4 in the case of the 8-bit incrementer/decrementer. For subsequent core stages of the incrementer/decrementer, the number of operations performed is also equal to the incrementer/decrementer width divided by 2, or 4 in the case of the 8-bit incrementer/decrementer.

Therefore, in accordance with the present invention, the routing complexity of the incrementer/decrementer is increased and the internal block fanout is decreased, as discussed in detail below. However, since this increase in routing complexity is accomplished using redundant overlapping of the operations in the manner shown in FIG. 3, increases in the amount of area required for implementing the incrementer/decrementer are not required.

Figure 4:
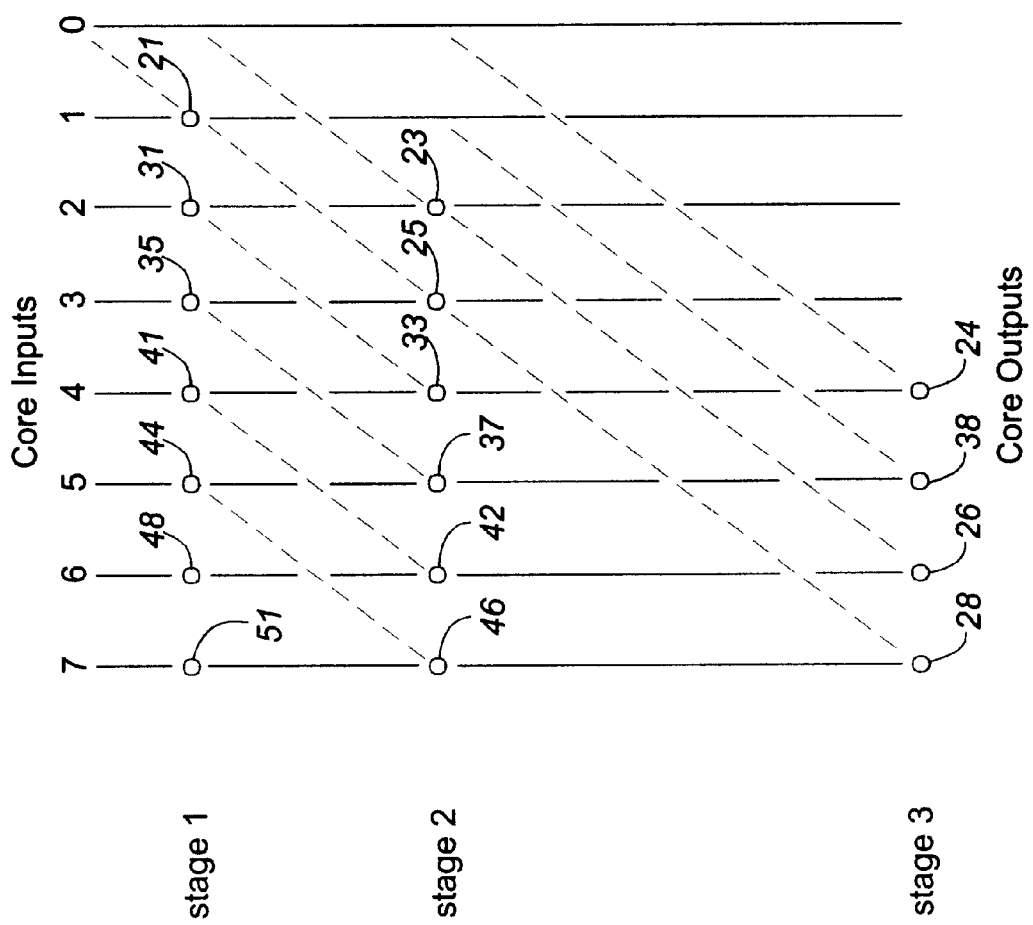
FIG. 4 functionally illustrates an 8-bit incrementer/decrementer designed and implemented in accordance with the modified binary tree structure shown in FIG. 3

FIG. 4 functionally illustrates an 8-bit incrementer/decrementer designed and implemented in accordance with the present invention. It can be seen in FIG. 4 that the incrementer/decrementer implements the modified binary tree structure shown in FIG. 3. In FIG. 4, the operators of stages 1, 2 and 3 are shown so that the routing complexity of the incrementer/decrementer of the present invention can be clearly demonstrated. As shown in FIG. 4, bit 0 is routed to stage 1 and operated on by operator 21. Bit 0 is also routed to stage 2 and operated on by operator 23. Bit 0 is also routed to stage 3 and is operated on by operator 24. The result of the operations performed by operator 21 in stage 1 is then used in stage 2 by operator 25. The result of the operation performed by operator 23 is routed to stage 3 and operated on by operator 26. The result of the operation performed by operator 25 in stage 2 is routed to stage 3 and operated on by operator 28.

Generally, each of the operators shown in FIG. 4 produces a propagate signal. The operators for the input stage are not shown, but are represented by the bit numbers 0 through 7. Also, only the incrementer comprises operators in the input stage. In the case of the decrementer, the input bit is simply passed to the appropriate operator in a subsequent stage, as discussed in detail below with reference to FIGS. 6–7F. For purposes of explaining the routing complexixty of the incrementer/decrementer architecture of the present invention, it will be assumed that FIG. 4 represents an incrementer. However, the architecture shown in FIG. 4 equally applies to a decrementer designed in accordance with the present invention.

The input stage operator represented by the bit 1 core input produces a propagate signal that is operated on by operator 21 in stage 1 along with the propagate signal produced by the input stage represented by the bit 0 core input. The propagate signal corresponding to the input stage operator represented by the bit 2 core input is also utilized by operator 31 in stage 1 in conjunction with the propagate signal produced by the input stage operator represented by the bit 1 core input. In turn, the operator 31 produces a propagate signal that is utilized by the operator 23 in stage 2 in conjunction with the propagate signal produced by the incrementer/decrementer input stage operator represented by the bit 0 core input.

The propagate signal produced by operator 23 is utilized by operator 26 in stage 3 in conjunction with the propagate signal produced by operator 42 in stage 2. The propagate signal produced by operator 31 in stage 1 is also utilized by the operator 33 in stage 2. The operator 33 produces a propagate signal that is used by operator 24 in stage 3. Since the routing complexity of the 8-bit incrementer/decrementer of the present invention is clearly shown in FIG. 4 by the solid and dashed lines, in the interest of brevity, a detailed discussion of the routing of all of the propagate signal and the operations performed thereon will not be provided herein.

The core outputs of the incrementer/decrementer shown in FIG. 4 are the propagate signal produced by the incrementer/decrementer input stage represented by the bit 0 core input and the propagate signal produced by the operator 21 of stage 1, by operators 23 and 25 of stage 2 and by operators 24, 38, 26 and 28 of stage 3. An output stage of the incrementer/decrementer which, for simplicity, is not shown in FIG. 4, operates on these propagate signals to produce the final outputs of the incrementer/decrementer, as discussed below in detail with respect to FIGS. 6, 7D and 7F.

As stated above, in accordance with the present invention, the maximum internal block fanout of the incrementer/decrementer is (incrementer/decrementer width)/8 for incrementer/decrementers that are at least 16 bits in width. For the 8-bit incrementer/decrementer shown in FIG. 4, the maximum internal block fanout is 2, even though this does not equal (incrementer/decrementer width)/8.

Figure 5:
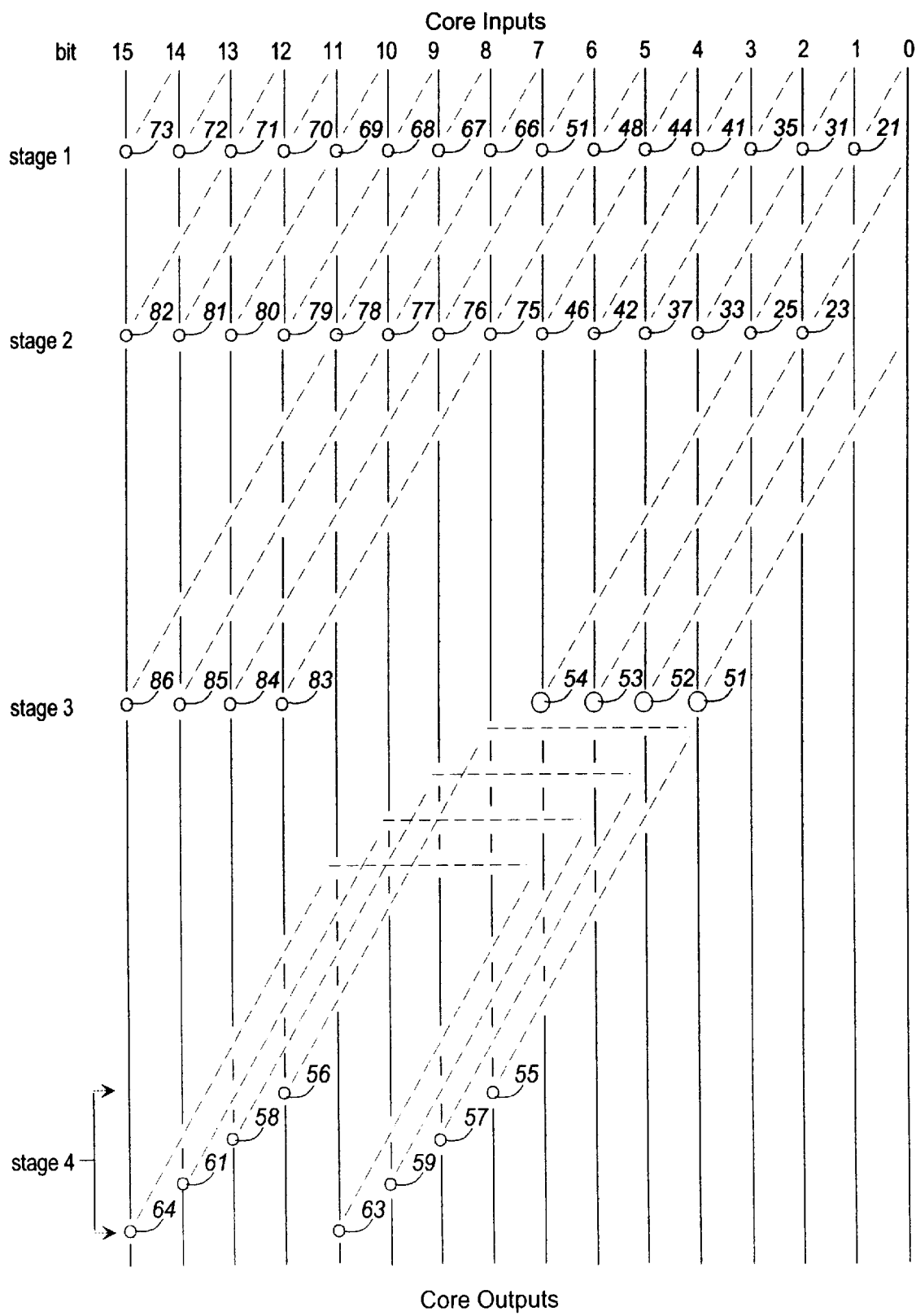
FIG. 5 functionally illustrates an 8-bit incrementer/decrementer designed and implemented in accordance with the modified binary tree structure shown in FIG. 3

FIG. 5 is a drawing functionally illustrating a 16-bit incrementer/decrementer in accordance with the present invention. As with the incrementer/decrementer shown in FIG. 4, the incrementer/decrementer of FIG. 5 also implements the modified binary tree structure shown in FIG. 3. The routing of the propagate signals is very similar to the routing discussed above with respect to FIG. 4. In stages 1 and 2, the operators for bits 0–7 are identical to those discussed above with respect to FIG. 4. However, with respect to the operators in stage 3 for bits 4–7, the logic gates are larger, hence they have more drive capacity to accommodate the additional routing load generated by having to route farther over several FET blocks to the operators in stage 4. For example, the propagate signal produced by operator 51 in stage 3 are provided to operators 55 and 56. Therefore, one propagate signal must be routed over the FET blocks in stage 4 corresponding to bits 5–7 to operator 55. The same propagate signal must be routed over the FET blocks in stage 4 corresponding to bits 5–11 to operator 56. Therefore, larger logic gates are needed for this larger routing distance.

However, it should be noted that, although larger gates are needed to maintain the necessary performance goals, each corresponding operator area is still implemented in the equivalent FET block area needed by other types of incrementer/decrementer architectures. For example, the incrementer/decrementer shown in FIG. 1 also is required to have a larger gate for core operator 10 in stage 3 to accommodate the increasing fanout. Consequently, the incrementer/decrementer of the present invention, including all necessary routing paths and connections, can be, although it does not have to be, implemented in accordance with minimum silicon area requirements.

Since the operators for bits 0–7 in stages 1 and 2 of the incrementer/decrementer of FIG. 5 are identical to the operations discussed above for the incrementer/decrementer of FIG. 4, the routing of those bits in stages 1 and 2 will not be discussed with respect to the incrementer/decrementer of FIG. 5. As stated above, a decrementer designed in accordance with the present invention does not have any operators in the input stage.

With respect to bits 4–7 in stage 3, operator 51 receives the signal corresponding to bit 0 and the propagate signal produced by operator 33 in stage 2. Operator 51 utilizes these signals to produce a propagate signal that is utilized by operators 55 and 56 in stage 4. Operator 52 in stage 3 utilizes the propagate signal produced by operator 21 in stage 1 as well as the propagate signal produced by operator 37 in stage 2. Operator 52 produces a propagate signal that is utilized in operators 57 and 58 in stage 4. Operator 53 in stage 3 utilizes the propagate signal produced by operator 23 in stage 2 as well as the propagate signal produced by operator 42 in stage 2 and produces a propagate signal that is utilized by operators 59 and 61 in stage 4. Operator 54 in stage 3 utilizes the propagate signal produced by operator 25 in stage 2 as well as the propagate signal produced by operator 46 in stage 2 and produces a propagate signal that is utilized by operators 63 and 64 in stage 4.

Stage 1 also comprises operators 66–73 which receive the propagate signals corresponding to the core inputs for bits 8–15. Operator 66 receives the propagate signals for bits 7 and 8 and produces a propagate signal that are provided to operators 75 and 77. Operator 75 produces a propagate signal that is utilized by operators 55 in stage 4 and 83 in stage 3. Operator 83 in stage 3 produces a propagate signal that is utilized by operator 56 in stage 4.

Operator 67 in stage 1 receives the propagate signal for bits 8 and 9 of the core inputs and produces a propagate signal that is provided to operators 76 and 78 in stage 2. Operator 76 in stage 2 produces a propagate signal that is provided to operator 57 in stage 4 and operator 84 in stage 3 Operator 84 produces a propagate signal that is utilized by operator 58 in stage 4. Operator 78 in stage 2 produces a propagate signal that is utilized by operator 63 in stage 4 and operator 86 in stage 3.

Operator 86 generates a propagate signal that is utilized by operator 64 in stage 4. Operator 68 in stage 1 receives the propagate signals for the core inputs corresponding to bits 9 and 10 and generates a propagate signal that is provided to operators 77 and 79 in stage 2. Operator 77 produces a propagate signal that is provided to operator 59 in stage 4 and to operator 85 in stage 3. Operator 85 in stage 3 produces a propagate signal that is utilized by operator 61 in stage 4.

Operator 69 in stage 1 receives the propagate signals for the core inputs corresponding to bits 10 and 11 and generates a propagate signal that is provided to operator 78 and to operator 80 in stage 2. Operator 78 produces a propagate signal that is provided to operator 63 in stage 4 and to operator 86 in stage 3. Operator 86 in stage 3 produces a propagate signal that is provided to operator 64 in stage 4. Operator 70 receives the propagate signals for the core inputs corresponding to bits 11 and 12 and produces a propagate signal that is provided to operators 79 and 81 in stage 2. Operator 79 produces a propagate signal that is utilized by operator 83 in stage 3. Operator 81 produces a propagate signal that is utilized by operator 85 in stage 3.

Operator 85 produces a propagate signal that is utilized by operator 61 in stage 4. Operator 71 in stage 1 receives the propagate signals for the core inputs corresponding to bits 12 and 13 and generates a propagate signal that is provided to operators 80 and 82 in stage 2. Operator 80 produces a propagate signal that is provided to operator 84 in stage 3.

Operator 82 in stage 2 produces a propagate signal that is utilized by operator 86 in stage 3. Operator 72 in stage 1 utilizes the propagate signals for the core inputs corresponding to bits 13 and 14 and produces a propagate signal that is provided to operator 81 in stage 2. Operator 73 in stage 1 utilizes the propagate signals for the core inputs corresponding to bits 14 and 15 in stage 1 and produces a propagate signal that is utilized by operator 82 in stage 2.

As with the incrementer/decrementer of FIG. 4, the maximum internal block fanout for the incrementer/decrementer of FIG. 5 is (incrementer/decrementer width)/8, or 2. The output of the incrementer/decrementer in FIG. 5 for bits 0–15 corresponds to the propagate signal for bit 0 and to the propagate signals produced by operators 21, 23, 25, 51, 52, 53, 54, 55, 57, 59, 63, 56, 58, 61 and 64, respectively. However, these signals are further operated on by an incrementer/decrementer output stage which, for ease of illustration, is not shown in FIG. 5. The output stage will be discussed in more detail below with respect to FIGS. 6–7F.

Figure 6:
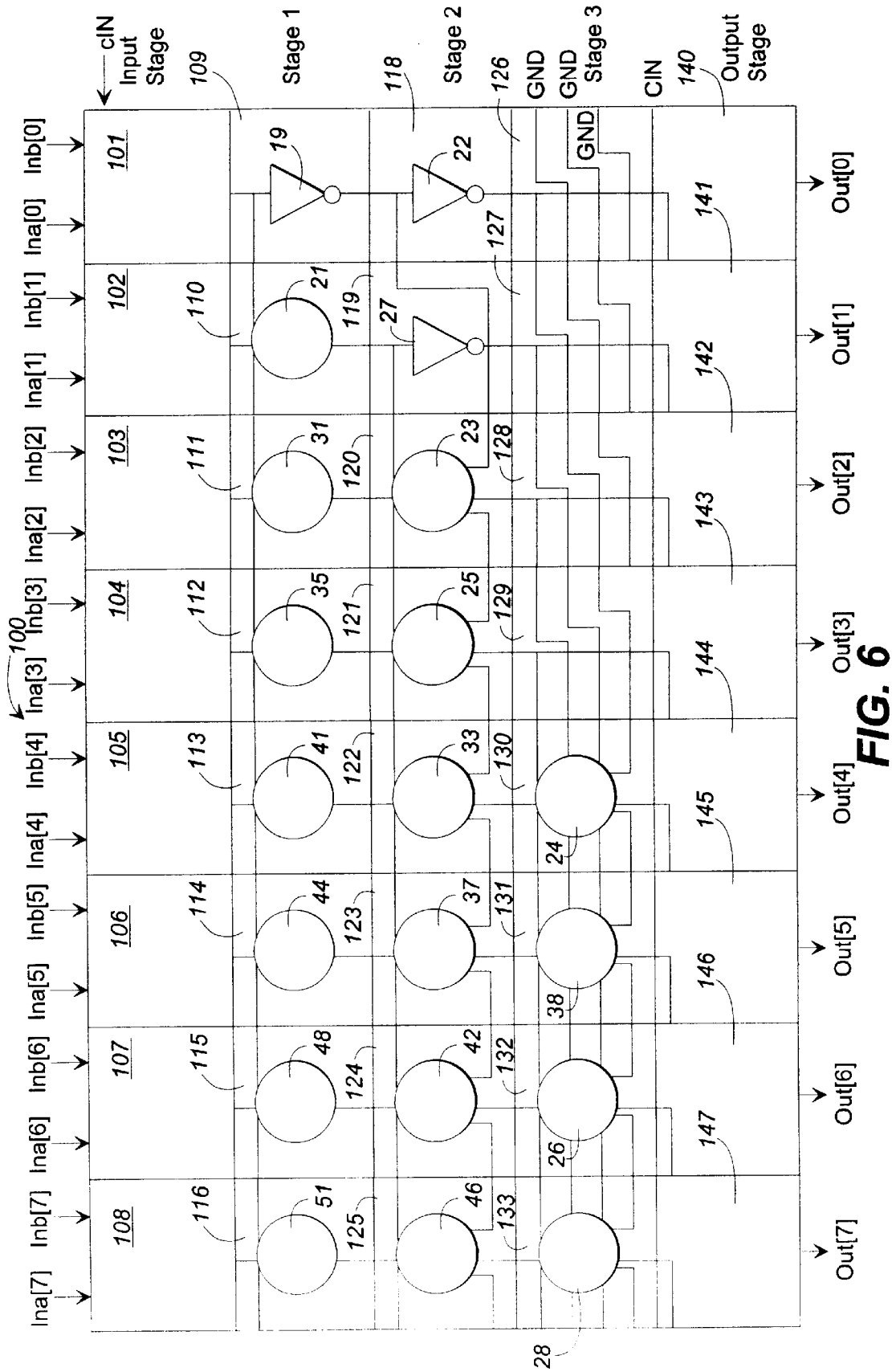
FIG. 6 illustrates a functional schematic diagram of an 8-bit incrementer/decrementer in accordance with the present invention which is implemented in accordance with the modified binary tree structure shown in FIG. 3.
Figure 7A:
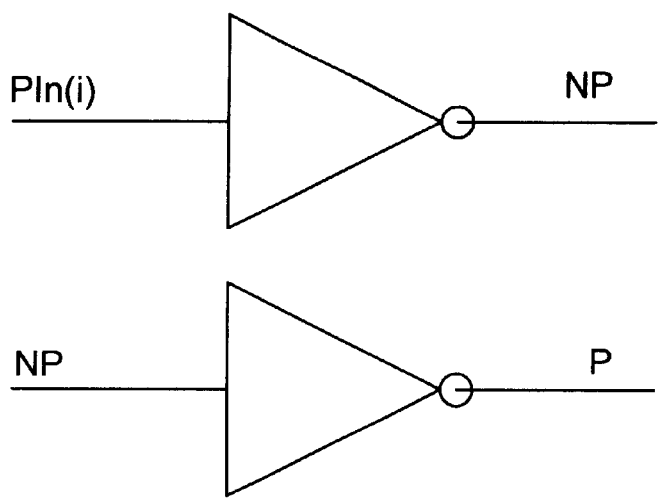
FIGS. 7A–7F are functional block diagrams of the logic circuits, or operators, implemented in various stages of the incrementer/decrementer shown in FIG. 6.
Figure 7B:
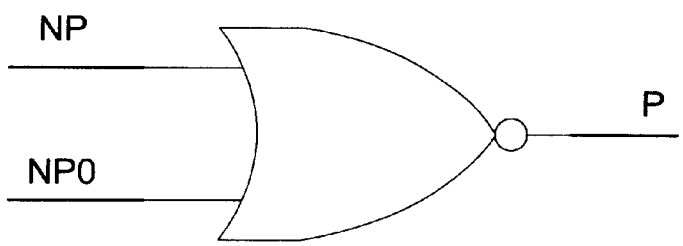

In order to better demonstrate the routing of bits in the incrementer/decrementer of the present invention, FIG. 6 illustrates a functional schematic diagram of an 8-bit incrementer/decrementer in accordance with the present invention. The operators shown in FIG. 6 are numbered to correspond to the operators in FIG. 4, except that the inverters 19, 22 and 27 shown in FIG. 6 were not shown in FIG. 4 for ease of illustration. The top row of blocks in FIG. 6 designated by numerals 101–108 correspond to the input stage of the incrementer/decrementer 100. The logic comprised by each of the blocks 101–108 is illustrated by the schematic block diagram shown in FIG. 7A. As shown in FIG. 7A, in the case of the incrementer, the input bits, In[0] through In[7], are operated on by an inverter to produce an inverted propagate signal NP. The operators shown in FIG. 6 operate on the inverted propagate signal and utilize NAND or NOR gates, depending on the stage.

It should be noted that the incrementer/decrementer of the present invention will have an input stage that varies depending on whether it is functioning as an incrementer or as decrementer. When functioning as a decrementer, the input bits will not be operated on by the bit cells of the input stage, but will simply be passed to a bit cell in a subsequent stage. When functioning as an incrementer, the bit cells of the input stage will comprise the inverter shown in FIG. 7A. However, which of the bit cells comprise inverters will also depend on the value by which the sum is being incremented.

For example, in the case where the sum is being incremented by a binary two, the first two bit cells 101 and 102 of the input stage will not comprise inverters. If the sum is being incremented by a binary 16, the first five bit cells of the input stage will not comprise inverters. In both of these cases, the input bit is simply passed to a bit cell in a subsequent stage. Therefore, the input bits either will or will not be routed through the inverters depending on whether the device is functioning as an incrementer or as a decrementer. Those skilled in the art will understand the manner in which such routing may occur. The incrementer/decrementer of the present invention increments by a power of two. The CIN input is tied to VDD and corresponds to the value being incremented/decremented, depending on whether the device is functioning as an incrementer or as a decrementer.

Blocks 109–116 correspond to stage 1 of the incrementer/decrementer 100. Block 109 comprises an inverter 19, as shown. Blocks 110–116 each comprise the operator shown in FIG. 7B. Blocks 118–125 correspond to stage 2 of the incrementer/decrementer 100. Blocks 118 and 119 comprise inverters, as shown in FIG. 6. Each of the blocks 120–125 comprises the operators shown in FIG. 7C. Blocks 126–133 correspond to stage 3 of the incrementer/decrementer 100. Blocks 126–129 do not contain any operators and the bits from the previous stages are simply routed through these blocks. Blocks 130–133 comprise the same operators as those shown in FIG. 7B for stage 1. Blocks 140–147 correspond to the output stage of the incrementer/decrementer 100. Blocks 140 and 142–147 comprise the operators illustrated in FIG. 7D. Block 141 comprises the operator illustrated in FIG. 7F.

Each of the operators 21, 31, 35, 41, 44, 48 and 51 in stage 1 receive the propagate signals NPO the previous bit cell in the input stage and the propagate signals NP from the bit cell immediately above it in the input stage. Each of the operators 21, 31, 35, 41, 44, 48 and 51 produce the propagate signals that will be utilized by the subsequent stages of the incrementer/decrementer, as discussed below in more detail.

Figure 7C:
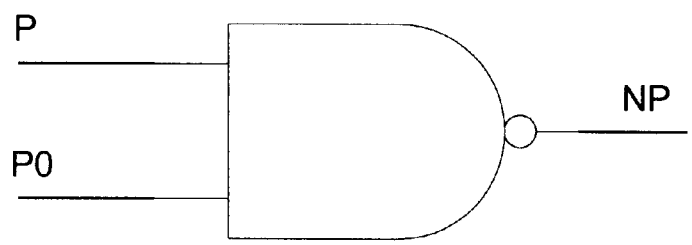

Each of the operators 23, 25, 33, 37, 42 and 46 of the stage 2 of the incrementer/decrementer, which are comprised of the logic illustrated by the block diagram of FIG. 7C, receives a propagate signal P0 from the operator corresponding to the bit two places behind, in stage 1. Each of the operators in stage 2 also receives a propagate signal P from the operator immediately above it in stage 1. The operators of stage 2 utilize these signals to produce inverted propagate signals NP, which are utilized by the operators in the subsequent stages of the incrementer/decrementer, as discussed below in more detail.

The operators 24, 38, 26 and 28 in stage 3 of the incrementer/decrementer each comprise the operator shown in FIG. 7B, as previously discussed. The inverted propagate signals NPO in FIG. 7B correspond to propagate signals produced by an operator of a previous stage. The inverted propagate signals NP in FIG. 7C correspond to the propagate signals received by each of the operators in stage 3 from the operators immediately above them in stage 2. Operator 24 in stage 3 receives the propagate signal output from the inverter 22 in block 118 of stage 2 as well as the propagate signal produced by operator 33 in stage 2.

The output of inverter 27 in stage 2 is routed across blocks 127, 128, 129 and 130 and then is input into operator 38 in stage 3 where it is utilized in conjunction with the inverted propagate signal NP output from operator 37 in stage 2. The output of operator 23 in stage 2 is routed across blocks 128, 129, 130 and 131 and then is input into the operator 26 in stage 3 where it is utilized by operator 26 in conjunction with the inverted propagate signal NP produced by and output from operator 42 in stage 2.

The inverted propagate signal NP output from operator 25 in stage 2 is routed over blocks 129, 130, 131 and 132 and then is input into operator 28 in stage 3 where it is utilized in conjunction with the inverted propagate signal NP produced by and output from operator 46 in stage 2.

Figure 7D:
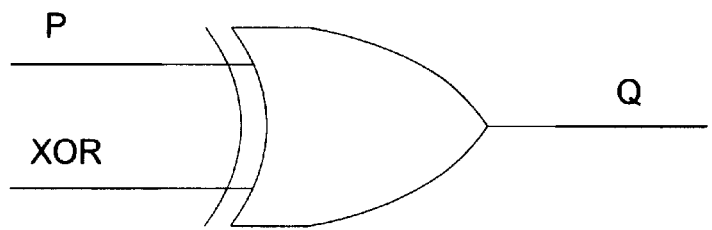
Figure 7E:
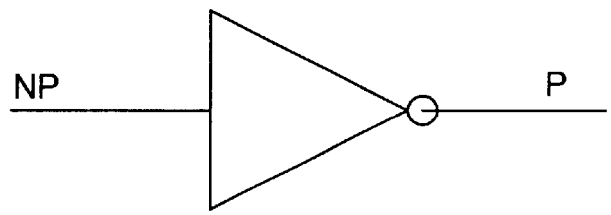
Figure 7F:
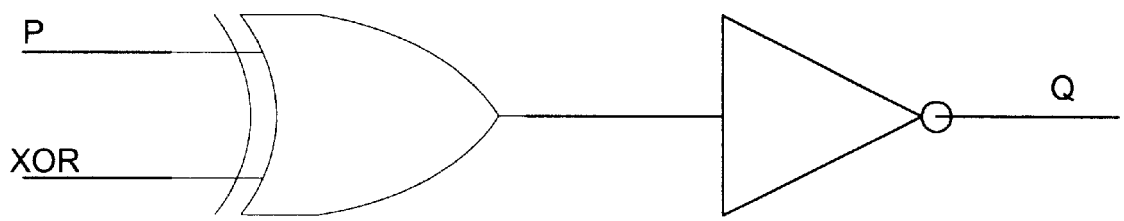

As stated above, blocks 140 and 142–147 of the output stage of the incrementer/decrementer each comprise the operator shown in FIG. 7D. The inputs, P and XOR in FIG. 7D correspond to the propagate signals from the previous bit position in stage 3 and to the signal routed down from the current bit position in the input stage. Block 141 comprises the operator shown in FIG. 7F. The inputs in FIG. 7F correspond to the propagate signals from the previous bit position in stage 3 and the signal routed down from the current bit position in the input stage. The outputs from blocks 140–147 of the output stage are the "Qs" shown in FIGS. 7D and 7F.

Although FIG. 6 illustrates an 8-bit incrementer/decrementer, those skilled in the art will understand the manner in which incrementer/decrementers of greater or lesser width can be implemented utilizing the concepts of the present invention demonstrated above with respect to FIGS. 3–7F. Generally, a 32-bit incrementer/decrementer in accordance with the present invention can be implemented by combining two of the 16-bit incrementer/decrementers functionally illustrated in FIG. 5. Similarly, a 64-bit incrementer/decrementer can be implemented in accordance with the present invention by combining two 32-bit incrementer/decrementers. The minimum width of the incrementer/decrementer is 4. The manner in which this can be accomplished will be understood by those skilled in the art in view of the above discussion. Therefore, in the interest of brevity, and due to the difficulty of illustrating the routing of the propagate and generate signals in the manner shown in FIG. 6 for incrementer/decrementers of greater width, such a discussion will not be provided. Also, it is believed that such a discussion would be redundant and unnecessary in view of the discussion provided above with respect to FIGS. 3–7F.

As stated above, the maximum internal block fanout for the incrementer/decrementers of the present invention illustrated by the drawings of FIGS. 3–6 is 2. In accordance with the present invention, the core of the incrementer/decrementer circuit is implemented in such a way that the total number of stages is equivalent to the quotient of the logarithm of the width of the incrementer/decrementer divided by the logarithm of 2. The operators are located in such a manner that the maximum fanout is (incrementer/decrementer width)/8. Therefore, in the case of a 16-bit incrementer/decrementer, for example, the number of core stages (i.e., not including input and output stages) is calculated as follows:

$$\text{Core Stages} = \frac{\text{Log } 16}{\text{Log } 2} = \frac{1.204}{0.301} = 4 \quad \text{(Equation 1)}$$

Equation 1 typically holds true for all incrementer/decrementers. The propagate operations for the incrementer/decrementer of the present invention are defined as follows:

$$P(i) = \{[pIN(1) = a(1)] \text{ for } n = 1 \text{ for decrementer} \quad \text{(Equation 2)}$$
$$= \{[pIN(1) = \overline{a}(1)] \text{ for } n = 1 \text{ for incrementer}$$
$$= \{[pIN(i)] \; o \; [P(i-1)] \text{ for } n \ge i > 1$$

where P(i) represents the outputs of the operators, pIN(i) represents the inputs to the operators, "i" represents the current bit, "n" represents the total number of bits of the incrementer/decrementer and "o" represents the operations performed.

Equations 1 and 2 define the operations of a incrementer/decrementer designed and/or implemented in accordance with the present invention, which hold true regardless of the width of the incrementer/decrementer. Those skilled in the art will understand, in view of the description provided above with respect to FIGS. 3–7F and Equations 1 and 2 the manner in which a incrementer/decrementer of any width can be designed and implemented in accordance with the present invention.

As stated above, the internal block fanout of the incrementer/decrementer of the present invention is optimized by utilizing additional routing. However, the additional routing can be accomplished while minimizing area requirements of the incrementer/decrementer due to the redundant overlapping operations utilized in the incrementer/decrementer. Thus, the overall performance is improved in terms of reduced fanout and this can be accomplished while utilizing only the minimum area required to implement the incrementer/decrementer architecture of the present invention. Furthermore, this relationship holds true regardless of the process used to fabricate the incrementer/decrementer of the present invention, i.e., the relationship is process-independent.

Different companies often use different processes to fabricate incrementer/decrementers. For example, one company might have one standard that defines the width of the metal conductors in the integrated circuit whereas another company might have a different standard that defines a different metal width for the conductors in the integrated circuit. Regardless of the process utilized, the routing complexity area can be scaled to the FET area for optimal performance.

It should be noted that the present invention has been described with respect to particular embodiments for the purpose of describing the present invention, but that the present invention is not limited to these embodiments. For example, although incrementer/decrementers are typically manufactured in silicon and the present invention has been described in some cases with respect to the silicon area required to implement the incrementer/decrementer, those skilled in the art will understand that the present invention equally applies to materials other than silicon.

Those skilled in the art will also understand that operators which are different from those shown in FIGS. 7A–7F but which are logically equivalent to those circuits can be used in accordance with the present invention. For example, it is well known to replace a combination of NAND and NOR gates with a combination of AND and OR gates. Those skilled in the art will understand that other modifications to the present invention discussed above can be made which are within the scope of the present invention, even though such modifications may not have been explicitly discussed above with respect to FIGS. 3–7F.

What is claimed is:

1. An incrementer device utilizing redundant overlapping of operations, the incrementer device comprising:

an input stage comprising at least first, second and third operators, the second operator being located in between the first and third operators, each operator having an input and an output, each operator receiving at its input a first bit signifying that the device is operating as an incrementer device as opposed to a decrementer device and a second bit representing a binary number by which the incrementer device will increment;

a first core stage, the first core stage comprising at least first and second operators, the first and second operators of the first core stage being adjacent one another, each operator of the first core stage having an input and an output;

routing circuitry interconnecting the outputs of the first and second operators of the input stage to the input of the first operator of the first core stage, the routing circuitry interconnecting the outputs of the second and third operators of the input stage to the input of the second operator of the first core stage, to enable redundant overlapping of operations to be achieved; and an output stage comprising at least first, second, and third operators, the second operator of the output stage being located between the first and third operators of the output stage, each operator of the output stage receiving at its input a propagate signal from a previous bit in a previous stage of the incremented device and the signal routed down from a current bit position in the input stage.

2. The incrementer device of claim 1, wherein the incrementer device has a maximum internal block fanout of 2.

3. The incrementer device of claim 1, further comprising a second core stage, the second core stage comprising at least a first operator, the routing circuitry interconnecting the output of the second operator from the first core stage and the output of the first operator from the input stage with the first operator of the second core stage.

4. The incrementer device of claim 3, wherein the incrementer device has a maximum internal block fanout of 2.

5. An incrementer system comprising:
    an input stage comprising at least N input stage operators, each input stage operator having an input and an output, each operator receiving at its input a first bit which signifies that the system is to operate as an incrementer system as opposed to a decrementer system and a second bit indicating a binary number by which the system will increment;
    a first core stage, the first core stage comprising N-1 operators, each operator of the first core stage having an input and an output;
    routing circuitry interconnecting the outputs of each pair of adjacent operators of the input stage with the input of a single, respective operator of the first core stage such that redundant overlapping of operations is achieved; and
    an output stage, the output stage comprising N operators, each operator of the output stage having an input and output, each operator of the output stage receiving at its input a propagate signal from a previous bit in a previous stage of the incremented system and a signal routed down from a current bit position in the input stage.

6. The incrementer system of claim 5, further comprising a second core stage, the second core stage comprising N-2 operators, the routing circuitry interconnecting the outputs of each pair of operators from the first core stage with the input of a single operator of the second core stage.

7. The incrementer system of claim 6, further comprising a third core stage, the third core stage comprising N/2 operators, the routing circuitry interconnecting the outputs of at least two operators of the second core stage with an input of one respective operator of the third core stage.

8. The incrementer of claim 7, wherein the incrementer has a maximum internal block fanout equal to incrementer width/8 for N equal to or greater than 16 and an internal block fanout equal to 2 for N less than 16.

9. The incrementer system of claim 6, wherein the incrementer system has a maximum internal block fanout equal to incrementer width/8 for N equal to or greater than 16 and an internal block fanout equal to 2 for N less than 16.

10. A decrementer device utilizing redundant overlapping of operations, the decrementer device comprising:
    an input stage comprising at least first, second and third operators, the second operator being located in between the first and third operators, each operator having an input and an output, each operator receiving at its input a first bit signifying that the device is operating as a decrementer device and a second bit representing a binary number by which the decrementer device will decrement;
    a first core stage, the first core stage comprising at least first and second operators, the first and second operators of the first core stage being adjacent one another, each operator of the first core stage having an input and an output;
    routing circuitry interconnecting the outputs of the first and second operators of the input stage to the input of the first operator of the first core stage, the routing circuitry interconnecting the outputs of the second and third operators of the input stage to the input of the second operator of the first core stage, to enable redundant overlapping of operations to be achieved; and
    an output stage comprising at least first, second, and third operators, the second operator of the output stage being located between the first and third operators of the output stage, each operator of the output stage receiving at its input the propagate signal from a previous bit in a previous stage and a signal routed down from a current bit position in the input stage.

11. The decrementer device of claim 10, further comprising a second core stage, the second core stage comprising at least a first operator, the routing circuitry interconnecting the output of the second operator of the first core stage and the output of the first operator of the input stage with an input of the first operator of the second core stage.

12. The decrementer device of claim 11, wherein the decrementer device has a maximum internal block fanout of 2.

13. The decrementer device of claim 10, wherein the decrementer device has a maximum internal block fanout of 2.

14. A decrementer system comprising:
    an input stage comprising at least N input stage operators, each input stage operator having an input and an output, each operator receiving at its input a first bit that the system is operating as a decrementer system and a second bit representing binary number by which the decrementer system is to decrement;
    a first core stage, the first core stage comprising N-1 operators, each operator of the first core stage having an input and an output;
    routing circuitry interconnecting the outputs of pairs of adjacent operators of the input stage with the input of a single, respective operator of the first core stage such that redundant overlapping of operations is achieved; and
    an output stage, the output stage comprising N operators, each operator of the output stage having an input and output, each operator of the output stage receiving at its input a propagate signal from a previous bit of a previous stage and a signal routed down from a current bit position in the input stage.

15. The decrementer system of claim 14, further comprising a second core stage, the second core stage comprising N-2 operators, the routing circuitry of the second core stage interconnecting the outputs of each pair of operators from the first core stage with the input of a single operator of the second core stage.

16. The decrementer system of claim 15, further comprising a third core stage, the third core stage comprising N/2 operators, the routing circuitry interconnecting the outputs of at least two operators of the second core stage with an input of one respective operator of the third core stage.

17. The decrementer of claim 16, wherein the decrementer has a maximum internal block fanout equal to incrementer width/8 for N equal to or greater than 16 and an internal block fanout equal to 2 for N less than 16.

18. The decrementer system of claim 15, wherein the decrementer system has a maximum internal block fanout equal to incrementer width/8 for N equal to or greater than 16 and an internal block fanout equal to 2 for N less than 16.

* * * * *